United States Patent
Li et al.

(10) Patent No.: US 7,103,098 B2
(45) Date of Patent: Sep. 5, 2006

(54) ADAPTIVE RECEIVER FOR MULTIPLEX/MULTI-ACCESS COMMUNICATIONS

(75) Inventors: Qinghua Li, Pleasanton, CA (US); Leslie A. Rusch, Quebec (CA)

(73) Assignee: Intel Corporation, Santa Clara, CA (US)

( * ) Notice: Subject to any disclaimer, the term of this patent is extended or adjusted under 35 U.S.C. 154(b) by 884 days.

(21) Appl. No.: 10/099,099

(22) Filed: Mar. 15, 2002

(65) Prior Publication Data

US 2003/0174788 A1    Sep. 18, 2003

(51) Int. Cl.
*H03H 7/30* (2006.01)
*H03H 7/40* (2006.01)
*H03K 7/00* (2006.01)

(52) U.S. Cl. .................. 375/229; 375/230; 375/232

(58) Field of Classification Search ............ 375/140, 375/147, 148, 229, 230, 231, 232, 233, 234, 375/235, 236, 316, 343
See application file for complete search history.

(56) References Cited

U.S. PATENT DOCUMENTS

| | | | | |
|---|---|---|---|---|
| 5,214,671 | A * | 5/1993 | Nakai | 375/232 |
| 5,414,699 | A * | 5/1995 | Lee | 370/342 |
| 5,418,817 | A * | 5/1995 | Richter | 375/232 |
| 5,475,710 | A * | 12/1995 | Ishizu et al. | 375/232 |
| 5,528,627 | A | 6/1996 | Yanagi et al. | |
| 6,385,239 | B1 * | 5/2002 | Okamoto et al. | 375/232 |
| 6,563,868 | B1 * | 5/2003 | Zhang et al. | 375/232 |
| 6,782,046 | B1 * | 8/2004 | Ling et al. | 375/232 |
| 6,947,481 | B1 * | 9/2005 | Citta et al. | 375/232 |
| 2001/0031022 | A1 * | 10/2001 | Petrus et al. | 375/324 |
| 2001/0043650 | A1 * | 11/2001 | Sommer et al. | 375/232 |
| 2002/0021750 | A1 * | 2/2002 | Belotserkovsky et al. | 375/232 |
| 2002/0045462 | A1 * | 4/2002 | Mottier | 455/526 |
| 2003/0125040 | A1 * | 7/2003 | Walton et al. | 455/454 |

OTHER PUBLICATIONS

Madhow, U., et al., "Differential MMSE: new adaptive algorithms for equalization, interference suppresion, and beamforming", 32nd Asilomar Conference on Signals, Systems and Computers, pp. 640-644, 1998.

Zhu, L. J. et al., "MMSE Interference Suppression for Rapidly Faded CDMA Systems: A New Formulation for Differentially Modulated Signals", ISIT 1998, Cambridge, MA, USA, Aug. 16-21, 1998.

Zhu, L. J. et al., "Adaptive Interference Suppression for Direct Sequence CDMA over Severely Time-Varying Channels", Globecom '97, pp. 917, Nov. 1997.

Honig, M. L. et al., "Performance of Adaptive Linear Interference Suppression for DS-CDMA in the Presence of Flat Rayleigh Fading", 1997 Vehicular Technology Conference, pp. 2191-2195, 1997.

(Continued)

*Primary Examiner*—Chieh M. Fan
*Assistant Examiner*—Jason M. Perilla
(74) *Attorney, Agent, or Firm*—Blakely, Sokoloff, Taylor & Zafman LLP (57) ABSTRACT

A received communication signal in which input data has been differentially encoded using a number of nominal symbols is filtered according to variable filter coefficients. A symbol is predicted based on the filtered signal, as if the input data had been encoded non-differentially in the communication signal. The filter coefficients are updated in response to the predicted symbol. An example of the differential encoding is differential phase shift keying (DPSK) modulation.

15 Claims, 5 Drawing Sheets

OTHER PUBLICATIONS

Miller, L. E. et al., "BER Expressions for Differentially Detected π/4 DQPSK Modulation", IEEE Transactions on Communications, vol. 46, pp. 71-81, Jan. 1998.

Verdu, S., "Adaptive Multiuser Detection", Proceedings of IEEE 3rd International Symposium on Spread Spectrum Techniques and Applications (ISSSTA '94), vol. 1, pp. 43-50, Jul. 1994.

* cited by examiner

ADAPTIVE RECEIVER FOR MULTIPLEX/MULTI-ACCESS COMMUNICATIONS

BACKGROUND

An embodiment of the invention is in general related to digital modulation communication systems and in particular to a receiver that can recover input data in the presence of multiplex/multi-access interference.

Communication systems are composed of at least one transmitter and at least one receiver. In digital modulation systems, input data (which is the information message to be communicated, such as a stream of binary bits) is encoded into nominal, digital symbols suitable for transmission over a particular channel. For example, with differential encoding, the information may be carried by the difference in phase between two successive waveforms. In some cases, a high frequency carrier waveform is modulated with the symbols (e.g. the symbols may be upconverted to passband), prior to being transmitted. At the receiver, the received communication signal may be demodulated (e.g. the symbols may be downconverted to baseband), prior to being decoded in an attempt to recover the input data.

In multiplex/multi-access communications, such as in a mobile telephone (e.g. cellular) network or a wireless computer network, a communication resource such as a carrier frequency is shared by many users who wish to transmit their input data simultaneously. The data for multiple units is transmitted over the same frequency band, but spread spectrum techniques are used to hold the mutual interference to manageable levels. The use of unique signature sequences for each transmission creates virtual channels within a single frequency band. A receiver may then be 'tuned' to a given channel, to detect the input data of a particular user. In this manner, each user may be assigned a separate virtual channel over which to communicate input data, to minimize interference with other users sharing the same communications resource. However, the ability of a receiver to detect this input data is impaired by the presence of noise (including interference) in its channel.

Various types of commonly occurring noise have been analyzed and mathematically modeled by those working in the field of communication systems. For example, there is the omnipresent additive white Gaussian noise. This noise may be represented by a term that is added to every transmitted signal. Also, certain channel environments have multiple paths from the transmitter to the receiver. These paths may be created by, for example, atmospheric reflections and refractions, and reflections from buildings or other objects. Such paths can cause a received communication signal to exhibit a multiplicative type of noise called multipath fading. Yet another type of noise, which is particularly apparent in a multiplex/multi-access communication system, is multiplex/multi-access interference caused by transmissions within the same frequency band but using different signature sequences (co-channel or intra-cell interference) and on adjacent frequency bands (inter-cell interference). This interference may be represented as an additive, time varying, noise term.

To compensate for noise which has corrupted a received communication signal, each receiver can be equipped with an adaptive filter. For example, in a typical differential encoding communication system, the adaptive filter can be positioned between a demodulation stage and a differential detection stage. The demodulation stage as mentioned above essentially removes the carrier waveform (if any) to yield a baseband communication signal. This signal contains the input data as differentially encoded into symbols, but corrupted by noise. The adaptive filter makes corrections to this signal according to a number of variable filter coefficients. The signal at the output of the adaptive filter is then processed by the differential detection stage which attempts to recover the input data using a differentially coherent detection scheme. An error signal, being a difference between the output of the detection stage and a reference, where this reference is predicted to be the input data that is sought by the detection stage, is generated. This error signal is fed back to the adaptive filter which in turn adjusts its coefficients according to an algorithm, in response to updates in the error signal. Over time, this closed loop feedback process is expected to converge to a set of filter coefficients that minimize the error signal and fully compensate for the noise. There is a trade-off between the speed of convergence and oscillation of the adaptive coefficients from their ideal values.

BRIEF DESCRIPTION OF THE DRAWINGS

The invention is illustrated by way of example and not by way of limitation in the figures of the accompanying drawings which illustrate embodiments of the invention. It should be noted that references to "an" embodiment of the invention in this disclosure are not necessarily to the same embodiment, and they mean at least one.

DETAILED DESCRIPTION

Various embodiments of the invention as a communications receiver and a method of recovering input data from a received communication signal are described. According to an embodiment of the invention, the receiver has an adaptive filter to make corrections to a received communication signal that has been corrupted by noise in the channel. Input data has been differentially encoded in the signal, as represented by a sequence of nominal symbols, by the transmitter. The receiver may operate as follows, beginning with a training mode followed by a decision direct mode. During training mode, the initial values of the variable coefficients of the adaptive filter are determined.

During decision direct mode, the coefficients are updated (according to an adaptive filter algorithm) in response to estimated symbols. These symbols are generated (for purposes of adapting the filter coefficients) based on the filtered communication signal, as if the input data had been encoded non-differentially in the communication signal. In other words, these estimated symbols are not obtained by a differentially coherent detection process even though the input data was differentially encoded. Faster and more accurate convergence of the coefficients may be obtained in this manner, in contrast to updating the coefficients based on differential detection (or differentially coherent detection) of the input data.

The input data may be recovered by a separate path from the filtered signal, by either a coherent or non-coherent scheme. A coherent detection scheme is one in which the receiver exploits knowledge of the carrier's phase. Examples of bandpass modulation schemes suitable for coherent detection include Phase Shift Keying (PSK), Frequency Shift Keying (FSK), Amplitude Shift Keying (ASK), Continuous Phase Modulation (CPM) and hybrid combinations of them. In contrast, non-coherent detection attempts to recover the input data without knowledge of the absolute value of the received communication signal's phase. Examples of bandpass modulation schemes suitable for non-coherent detection include Differential Phase Shift Keying (DPSK), Differential FSK, Differential ASK, Differential CPM, and their hybrids. It should be noted that 'differentially coherent detection' as used in the field of digital modulation communication systems is frequently used to designate a non-coherent detection process.

Figure 1:
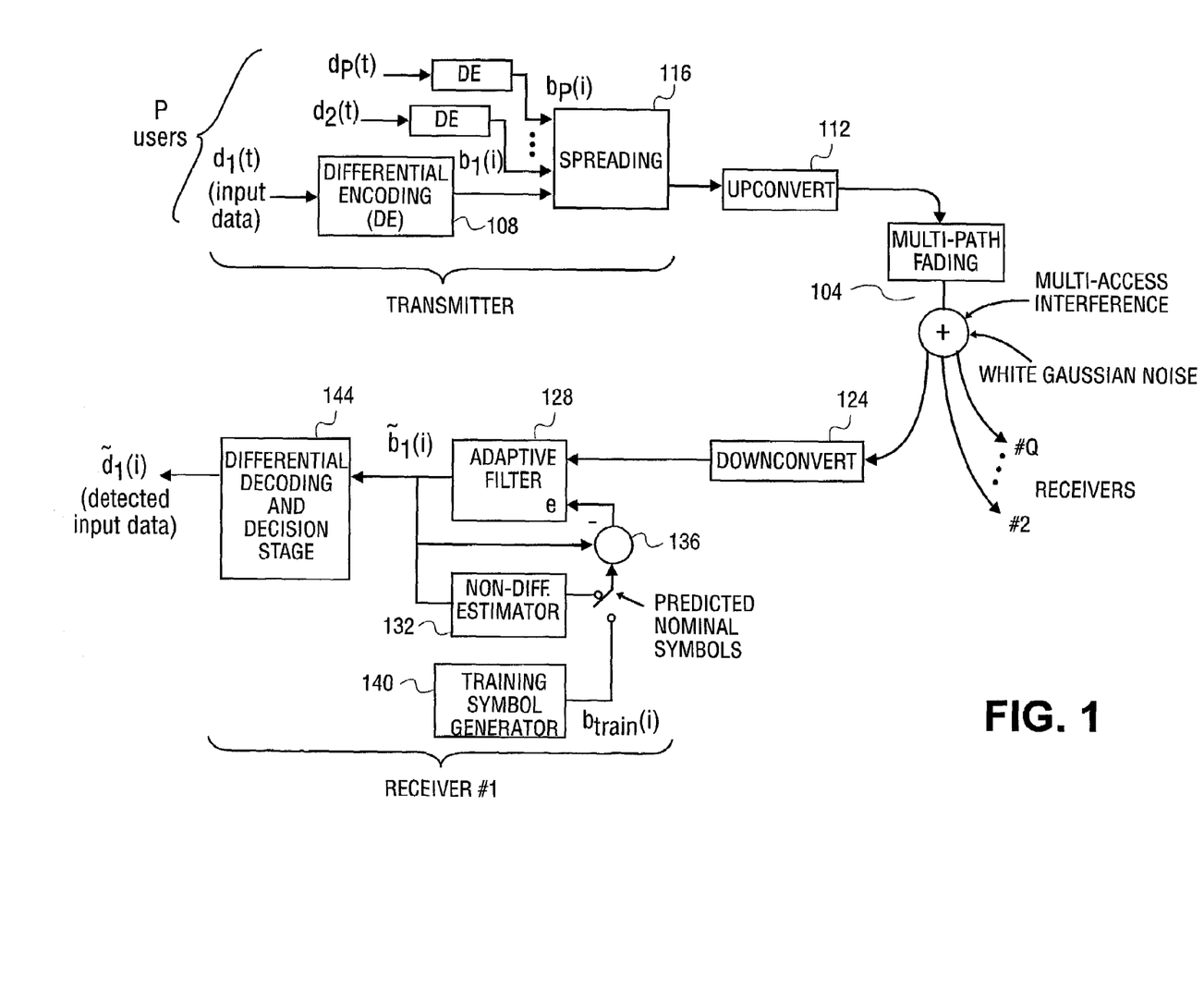
FIG. 1 shows a block diagram of a communication system containing an adaptive receiver.

Referring now to FIG. 1, the communication system shown in this figure is a multiplex/multi-access system in which there are P users and Q receivers. A transmitter and a receiver are shown, 'tuned' to allow a given user to communicate with another. Such receivers reduce to tolerable levels the interference caused by other users. At the transmitter, input data as a waveform $d_1(t)$ is fed to a differential encoding stage 108 to yield a sequence of nominal symbols in the form of a sequence $b_1(i)$. Differential encoding for phase shift keying refers to the situation in which the information (input data) is carried by the difference in phase between two successive waveforms (represented by the nominal symbols b(i)). In the embodiment of the invention depicted in FIG. 1, a discretization is occurring in which the symbol values are defined at a sample index i, in contrast to a continuous time index t. Thus, each symbol of input data is defined to be d(i) while each symbol of the differentially encoded message is b(i).

An example of a differential encoding process that can be used in the system of FIG. 1 is differential binary phase shift keying (i.e., DBPSK). The table below shows an information message sequence d(i) having been differentially encoded into DPSK symbol values that represent one of two phase shifts of 0 degrees and 180 degrees. In the table below, the present symbol bit b(i) is a +1 if the message bit d(i) and the prior symbol bit b(i−1) are the same. Otherwise, the symbol bit b(i) is a −1. The fourth row in the table below translates the coded symbol sequence b(i) into a phase shift sequence θ (i), where a +1 is characterized by a 180 degree phase shift, and −1 is characterized by a 0 degree phase shift.

| Sample index, i | 0 | 1 | 2 | 3 | 4 | 5 | 6 | 7 | 8 | 9 | 10 |
|---|---|---|---|---|---|---|---|---|---|---|---|
| Information message, d(i) | | 1 | 1 | 0 | 1 | 0 | 1 | 1 | 0 | 0 | 1 |
| Differentially encoded message (first bit arbitrary), b(i) | 1 | 1 | 1 | −1 | −1 | 1 | 1 | 1 | −1 | 1 | 1 |
| Corresponding phase shift, θ(i) | π | π | π | 0 | 0 | π | π | π | 0 | π | π |

A scheme for detecting input data that has been encoded according to DPSK will be described further below. For now, it should be noted that the differential encoding stage 108 can be implemented by other alternatives to DPSK, including for example differentially encoded M-ary amplitude and phase shift keying. In that case, there are M nominal symbols b(i) each being a vector in a symbol constellation space, having a unique amplitude and angle combination. In contrast, purely phase shift keying yields symbols which differ from each other only by a measured angle.

After the input data have been encoded into nominal symbols, they may be spread by a spreader stage 116 prior to being upconverted to a higher frequency by an upconversion stage 112. Spreading is a technique that can allocate a communication resource more efficiently, so as to increase the throughput or total data rate of the resource. The increase in throughput is, in this case, designed to handle multiple access or multiplexing, which refers to the sharing of a fixed communication resource. For example, in the context of a satellite transponder, the problem is to efficiently allocate portions of the transponder's fixed communication resource to a large number of users who seek to communicate digital information to each other at a variety of bit rates and duty cycles. Various ways of distributing the communications resource under multiplexing/multiple access are frequency division, time division, code division, as well as others. The spreader stage 116 is designed to allow encoded signals to share a communication resource without creating unmanageable interference to each other in the detection process. The function of the spreader 116 corresponds to an inverse or de-spreading function that is performed at the receiver. The spreading and de-spreading functions of a transmitter-receiver pair are tuned to each other so as to allow the receiver to detect the input data of a given user.

As to the upconversion stage 112, this stage may be incorporated into the spreader 116 or it may be a separate stage by itself. Upconversion serves to shift a baseband signal to a higher frequency (passband) to yield more efficient use of a frequency spectrum or take advantage of better propagation characteristics through a transmission medium 104. In some cases, the upconversion stage 112 also modulates a carrier sinusoid in accordance with the nominal symbols to be transmitted.

The transmission medium 104 may support guided or unguided carrier waves that contain the transmitted communication signal. The transmission medium 104 may be subject to multipath fading, in addition to additive white Gaussian noise and multiplex/multi-access interference. Additional noise sources such as narrow band jamming may further corrupt the communication signal that is received at the receiver. As will be described below, the use of an adaptive filter 128 helps compensate for all such noise so as to improve the reliability of recovering the input data at the receiver.

At the receiver, the communication signal may be down converted by a down conversion stage 124 prior to being de-spread. In certain embodiments of the invention, such as when the communication signal is fully digitized after down conversion, the de-spreading function may be incorporated into the transfer function of the adaptive filter 128 that is implemented by a discrete time filter.

The adaptive filter 128 has its filtering characteristics controlled by a number of variable filter coefficients. These coefficients may be selected such that the transfer function of the adaptive filter 128 includes de-spreading, suppressing the additive white Gaussian noise and multi-access interference, as well as compensating for any multipath fading and other sources of noise. The values of the variable filter coefficients are updated in response to a signal at the error input of the filter 128. This error signal is generated by a subtractor 136.

During a training mode in which the filter coefficients are initialized, the error signal is a measure of the difference between a training symbol $b_{train}(i)$ and a sample from the output of the adaptive filter 128. A synchronization process (not shown) insures that the sampled adaptive filter output corresponds to the training symbol that has been encoded in the communication signal and that appears, in its nominal form, at the output of the training symbol generator 140. Thus, during the training period, the transmitter and the receiver are both aware of a training sequence of input data being transmitted and received. The adaptive filter coefficients are repeatedly updated during the training period in response to the sequence of training symbols $b_{train}$ (i), so as to converge to an initial set of filter coefficients that are expected to minimize the absolute value of the error signal for the training symbols.

Figure 4:
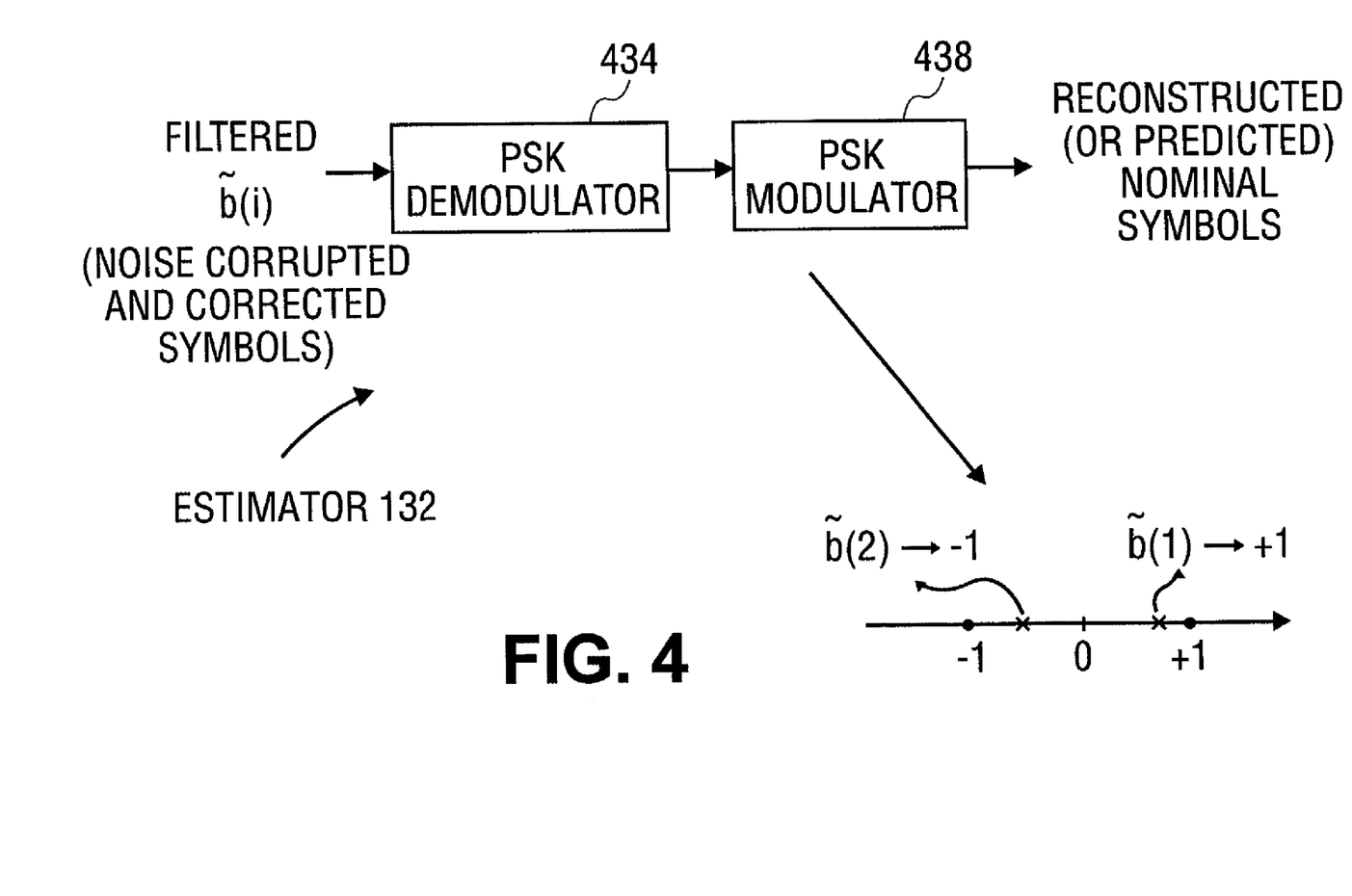
FIG. 4 shows a block diagram of a non-differential estimator.

After the training period, the receiver may be placed in decision direct mode to detect input data that is actual system content from the transmitter. In that mode, an input of the subtractor 136 is coupled to an output of a non-differential estimator 132. The estimator 132 is designed to generate nominal symbols that represent input data that has been encoded non-differentially in a signal at its input. In other words, the estimator 132 is not a differential detector in a sense of making a prediction regarding a nominal symbol by comparing the values of two successive symbols; rather, the non-differential estimator 132 generates its prediction as if the signal at its input contains data that has been encoded non-differentially. FIG. 4, to be discussed below, illustrates an implementation of the estimator 132 that uses a phase shift keying demodulator-modulator pair to obtain the predicted nominal symbol. The input of the non-differential estimator 132 is coupled to an output of the adaptive filter 128, where this output provides a corrected communication signal in which input data has been differentially encoded.

Rather than generate an error signal based on detected input data, the receiver illustrated in FIG. 1 generates the error signal based on predicted nominal symbols from the estimator 132. Updates to the filter coefficients are then made, based on this error signal. The recovered input data may be obtained more reliably if such a filter coefficient adaptation technique is used during decision direct mode.

To actually reconstruct the input data, a detection stage 144 may be used to reconstruct the input data that had been differentially encoded in the communication signal. According to an embodiment of the invention, the detection stage 144 performs differential decoding followed by decision making regarding the symbol being detected. The differential decoding is combined with an integration function (not shown explicitly in FIG. 1) to yield an auto correlator which, along with the decision stage, performs differential detection. This auto correlator essentially matches a symbol with a previous symbol, to provide a measure of how closely the current symbol matches the previous one. Since the corrected symbols $\tilde{b}$(i) may still be noise corrupted, even after being corrected by the adaptive filter 128, a decision may need to be made as to which is the most likely nominal symbol that corresponds to the current symbol $\tilde{b}$(i). Note that the detection stage 144 attempts to detect the input data by comparing the current symbol with the previous symbol (hence the label 'differential decoding'). In contrast, the non-differential estimator 132 performs no such comparison, but rather may consider each symbol value independently in determining a predicted nominal symbol.

Figure 2:
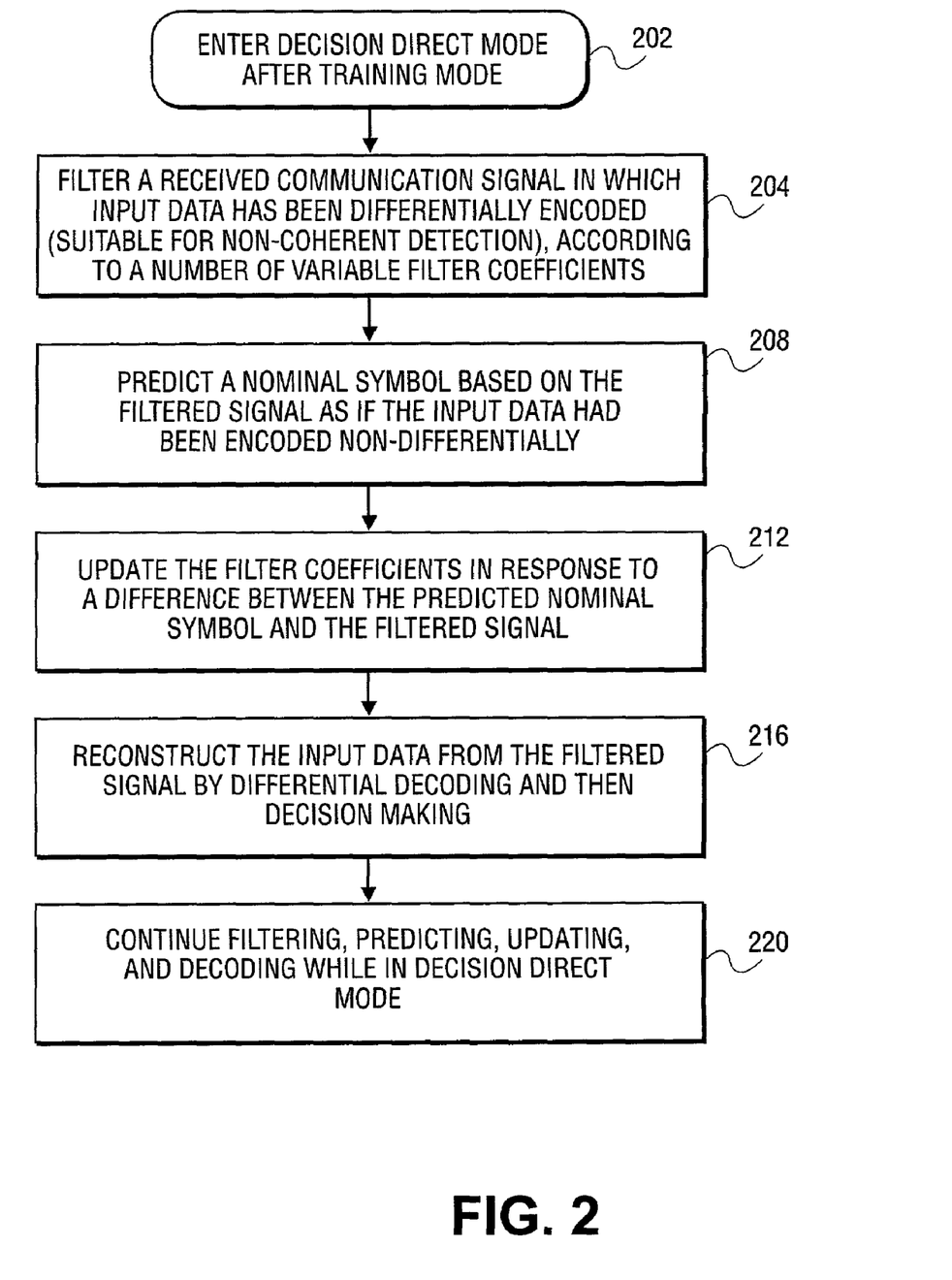
FIG. 2 depicts a flow diagram of a method for detecting input data from a received communication signal.

Referring now to FIG. 2, what is shown is a flow diagram of a method for recovering input data in a received communication signal. This received communication signal may be digitized at the receiver and then digitally filtered by an adaptive filter, according to variable filter coefficients. In addition, this received communication signal may be a multiplexed/multi-access spread spectrum signal in which transmissions for multiple users have been additively combined as shown in FIG. 1.

The method is directed to the decision direct mode which may follow a training mode in which the variable filter coefficients are initialized (block 202). A received communication signal is filtered, where the signal has input data that has been differentially encoded therein. This filtering is performed according to a number of variable filter coefficients (block 204). Note that the differentially encoded data is of the type suitable for differential detection. For example, the input data may be encoded according to differential phase shift keying modulation as was mentioned above. A nominal symbol is predicted based on the filtered signal, as if the input data had been encoded non-differentially (block 208). For instance, the symbol may be predicted to be the nominal symbol point that is closest to a sample of the filtered signal, when plotted in a symbol constellation space. The filter coefficients are updated in response to a difference between the predicted nominal symbol and the filtered signal (the error). Thus, in the discrete time embodiment, the filter coefficients are updated in response to an error signal being a difference between the predicted symbol and a sample of the filtered signal (block 212).

As to reconstructing the input data, a differential detection procedure may be used (block 216). The differential detection procedure may include integration of the communication signal over a symbol period, followed by differentially decoding and then performing a symbol decision process, based on the filtered signal. The system depicted in FIG. 5 below features an exemplary differential detection process that is particularly suitable for communication signals in which the input data has been encoded according to differential phase shift keying modulation. As an alternative, a coherent detector may be used for increased performance. Such a detector may be implemented by adding a phase reference input to the down conversion stage 124 (see FIG. 1).

The operations of filtering, predicting, updating, and decoding as described above are repeated while the receiver is in decision direct mode, thereby repeatedly updating the filter coefficients to converge to a set of values that minimize the error (block 220).

Figure 3:
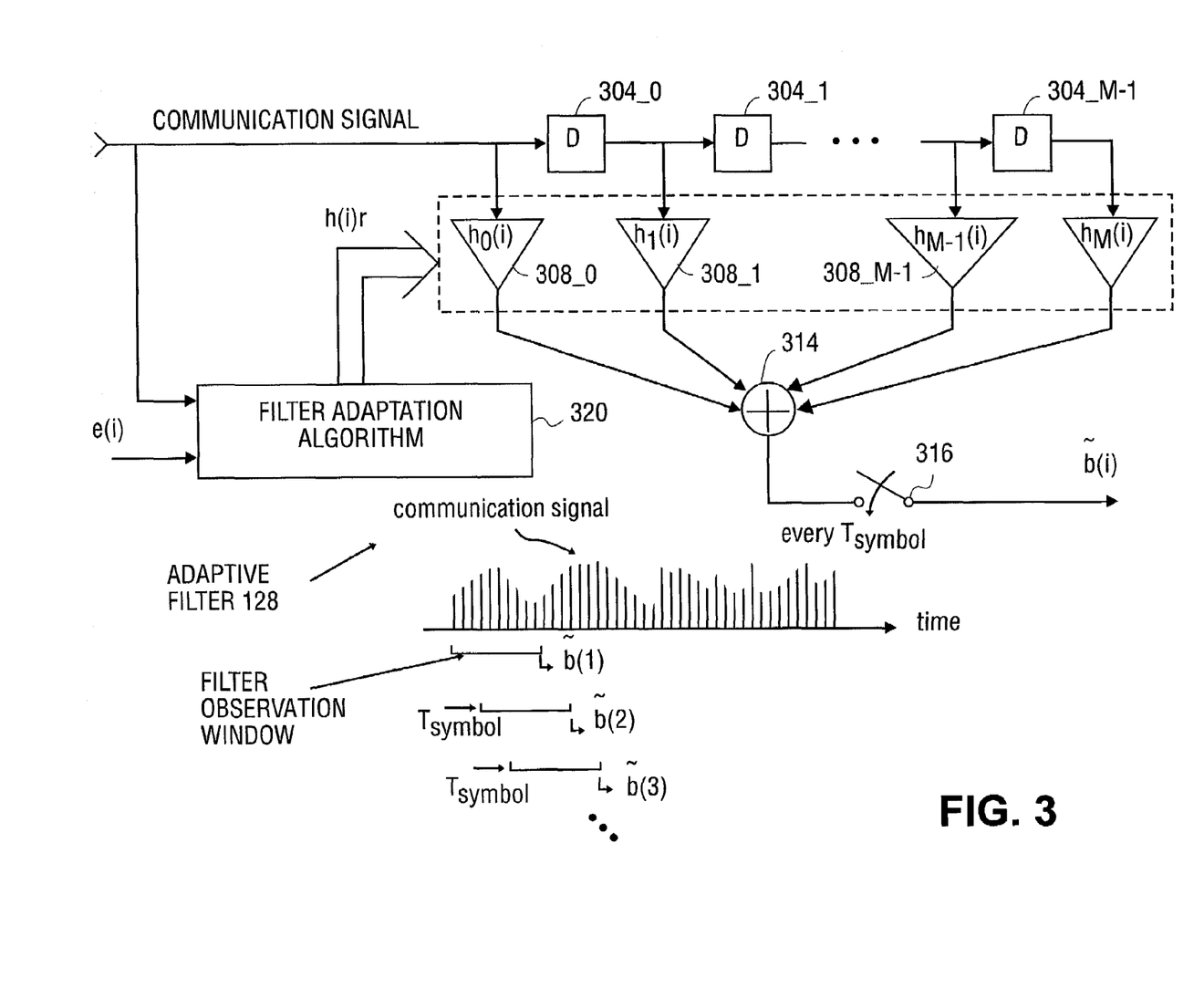
FIG. 3 illustrates a block diagram of an adaptive filter.

Turning now to FIG. 3, what is shown is a block diagram of part of an adaptive filter 128 suitable for filtering a digitized baseband communication signal. This is a discrete time filter with M delay stages 304_0, 304_1 . . . 304_M−1. The digitized baseband communication signal is fed one sample at a time into the array of delay elements 304. A summer 314 receives the outputs of M+1 multipliers 308_0, 308_1 . . . 308_M. Each multiplier 308 multiplies its input sample by a variable filter coefficient $h_0$ (i), $h_1$ (i) . . . $h_M$(i). A sample switch 316 is provided to deliver an output of the summer 314 at the end of each symbol interval T, as a corrected symbol $\tilde{b}$(i). A conventional filter adaptation algorithm 320 such as minimum mean square error (i.e., MMSE), least mean square, or recursive least square is used to update the coefficients h(i) in response to an input error signal e (i) and the communication signal. The MMSE algorithm may be applied to minimize the mean output energy and maximize the signal to interference ratio for a code division multiple access (i.e., CDMA) application. The recursive least square error (i.e., RLS) algorithm gave better bit error rate performance during simulations. The filter adaptation algorithm 320 may be designed to recognize that the coefficients h(i) help define a filter transfer function which also includes the effect of functions other than noise compensation, including, for example, despreading.

In the implementation shown in FIG. 3, the 'observation window' of the adaptive filter 128 is M samples wide. The window is shifted in this embodiment of the invention by a number of samples equal to the symbol period, T, so that consecutive symbols are provided at the output of the switch 316 at a rate 1/T. However, in multipath channels, the adaptive filter may observe more than a single symbol interval in order to suppress intersymbol interference as well as the other interference sources mentioned.

The output of the adaptive filter is processed by the non-differential estimator 132 (see FIG. 1). This estimator is designed to generate nominal symbols that represent data that has been encoded non-differentially in a signal at its input. However, the signal actually fed to its input, from the output of the adaptive filter, contains input data that has been encoded differentially. One way to obtain these reconstructed or predicted nominal symbols is to use a sequence of a phase shift keying demodulator 434 followed by a phase shift keying modulator 438 as shown in FIG. 4. FIG. 4 also illustrates the net result that may be achieved by the estimator 132, using as an example a graph of two symbols $\tilde{b}(1)$ and $\tilde{b}(2)$. The estimator 132 treats each symbol independently in reconstructing or predicting the nominal symbol. Thus, in the example shown, the nominal symbol that is predicted for $\tilde{b}(1)$ is +1. In contrast, the nominal symbol predicted for $\tilde{b}(2)$ is −1. Another way to achieve such a prediction is to use a maximum likelihood estimator that selects the nominal symbol which is most likely to be the one that was encoded in the communication signal from which $\tilde{b}(i)$ has been derived. Such a maximum likelihood estimator may simply select the nominal symbol that is physically closest to the noise corrupted symbol $\tilde{b}(i)$. Other types of non-differential estimators, which essentially ignore or do not take advantage of the differential encoding that took place at the transmitter to yield the symbols $\tilde{b}(i)$, may be used.

Figure 5:
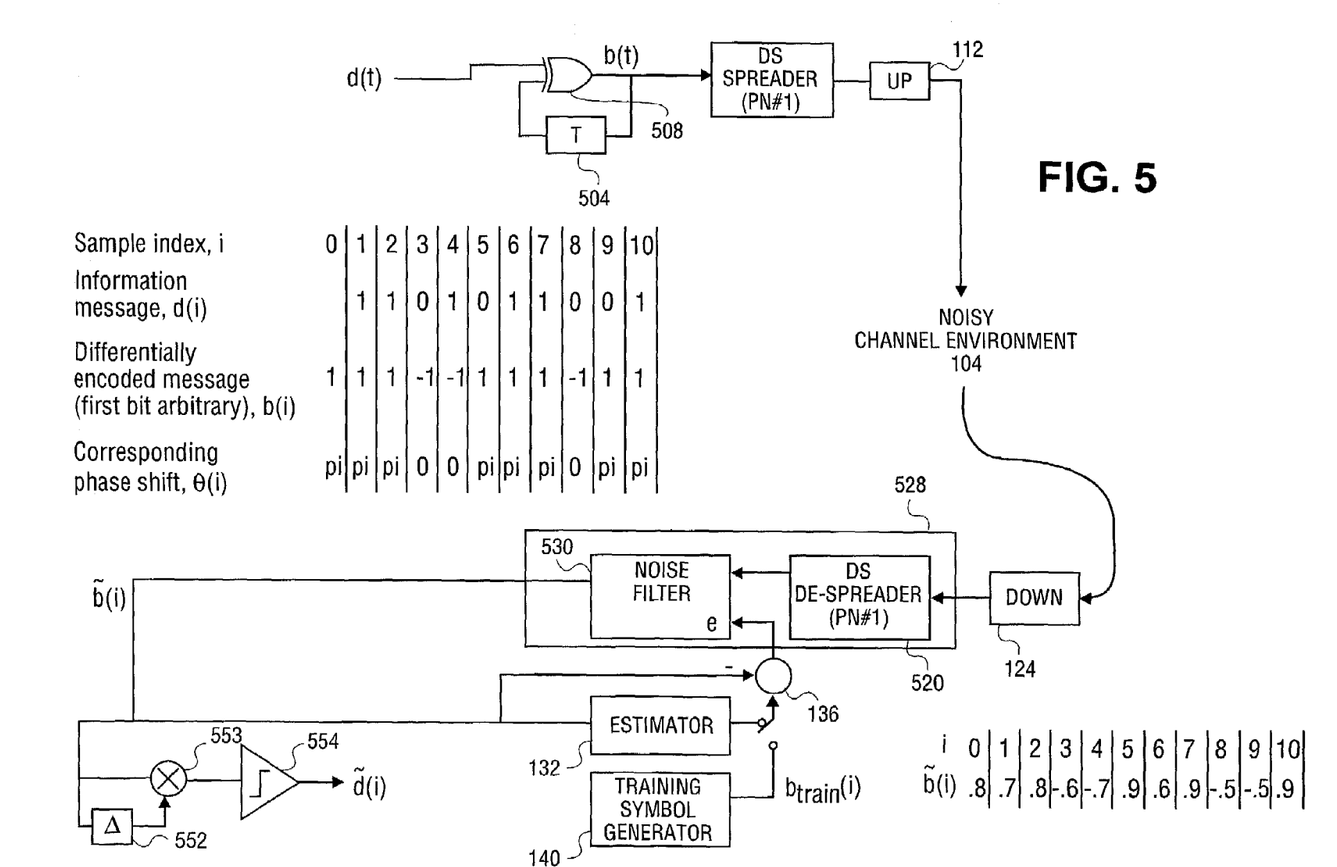
FIG. 5 depicts a block diagram of a communication system containing another adaptive receiver.

Turning now to FIG. 5, what is shown is a block diagram of a communication system featuring another embodiment of the invention. The system allows the transmitter to communicate with a receiver via a noisy channel environment 104. At the transmitter, input data in the form of a waveform d(t) as a binary waveform is provided to an input of an exclusive or gate 508. The output of the gate 508 is fed back to a further input of gate 508 via a bit delay element 504. Thus, in this case in which each bit of input data is converted into one symbol, the bit delay is the same as the symbol delay, T. The output of the exclusive or gate 508 is a differentially encoded symbol waveform b(t) which is fed to a direct sequence (i.e., DS) spreader having a given pseudo noise code PN #1 (element 516). Although not shown explicitly, the symbol waveform b(t) is also used to modulate a carrier waveform. This modulation of the carrier may be accomplished by an upconversion stage 112. If desired, the spread signal at the output of the spreader 516 may be further upconverted by the upconversion stage 112 prior to being transmitted through the noisy channel environment 104.

At the receiver, the communication signal may be down converted by a down conversion stage 124 prior to being digitized and fed to a digital filter 528. This version of the digital filter performs despreading 520 according to a pseudo noise code PN #1, noise filtering 530 including, for example, compensating for time varying fading channels and multi-access interference, and integration 542, to deliver a corrected, noise corrupted symbol $\tilde{b}(i)$. Note that the demodulation of the carrier waveform mentioned in the previous paragraph may be performed by either the downconversion stage 124 or the despread stage 520. It can be seen that the corrected symbol sequence $\tilde{b}(i)$ is still "noisy", as compared to the differentially encoded, noise-free message b(i) at the transmitter, which is a sequence of only two nominal symbol values, +1 and −1. These corrected symbols are then fed to a differential decoding stage composed of a single sample delay element 552 and a multiplier 553. The output of the multiplier 553 is then fed to a comparator 554 which performs a decision making role to determine whether a logic '1' or '0' is being recovered. The rest of the receiver including the estimator 132 and training symbol generator 140 used to update the filter coefficients may be the same as the ones shown in FIG. 1.

The following is yet another embodiment of the invention as a method for recovering input data in an adaptive receiver described above.

Initialization:

Reset filter coefficients, $h_m(i)=0, m=0, 1, \ldots, M$, where M+1 is the number of filter taps.

Synchronize the training symbol generator with the received training signal such that the received signal of each training symbol roughly falls in the filter's observation window for the symbol.

Training Mode:
For i=1, 2, . . . , $N_t$, where $N_t$ is the number of training symbols.
Compute error $$e(i) = b_{train}(i) - \sum_{m=0}^{M} h_m^*(i) \cdot p((i-1)T + mT)$$

where p(t) is an input signal to the adaptive filter.
Based on e(i) and p(t), update filter h(i) using an adaptive algorithm.

End

Decision-Direct Mode:

For i=1, 2, . . . , $N_d$, where $N_d$ is the number of actual system content symbols.
Sample filter output, $$\tilde{b}(i) = \sum_{m=0}^{M} h_m^*(i) \cdot p((i-1)T + mT)$$

Map $\tilde{b}(i)$ to the nearest nominal PSK constellation point b(i), for example, $b_{predicted}(i) = arg\ min_{b(i)} |b(i) - \tilde{b}(i)|$.

Compute error, $e(i) = \tilde{b}(i) - b_{predicted}(i)$.

Based on e(i) and p(t), update filter h(i) using an adaptive algorithm.
Differentially decode $\tilde{b}(i)$ to obtain input data estimate $\tilde{d}(i)$.

End

To summarize, various embodiments of the invention, such as, for example an adaptive receiver suitable for use in multiplex/multi-access, digital modulation communication systems, have been described. In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method comprising:
   filtering, according to a plurality of variable filter coefficients, a received communication signal in which input data has been encoded according to differential phase shift keying (PSK) modulation;
   predicting a symbol based on the filtered signal by performing non-differential PSK demodulation upon the filtered signal and non-differential PSK modulation upon the demodulated filtered signal; and
   updating the plurality of filter coefficients in response to the predicted symbol.

2. The method of claim 1 wherein the predicted symbol is a nominal symbol point that is closest to a sample of the filtered signal when plotted in a symbol constellation space.

3. The method of claim 2 wherein the filter coefficients are updated in response to an error signal being a difference between the predicted symbol and the a sample of the filtered signal.

4. The method of claim 1 wherein the received communication signal is digitized and digitally filtered.

5. The method of claim 1 further comprising performing a training process during which the plurality of variable filter coefficients are repeatedly updated in response to training symbols; and then performing said filtering, predicting and updating during decision direct mode; and
   differentially decoding the input data from the filtered signal.

6. The method of claim 1 wherein the received communication signal is a multi-access spread spectrum communication signal, and the filtering includes despreading the signal.

7. An apparatus comprising:
   an adaptive filter whose filtering characteristics are controlled by a plurality of variable filter coefficients whose values are updated in response to a signal at an error input, a further input of the filter being coupled to receive a communication signal in which input data has been differentially encoded;
   an estimator having an input coupled to an output of the adaptive filter, the estimator having a non-differential phase shift keying (PSK) demodulator having an input that is coupled to the output of the adaptive filter, and a non-differential PSK modulator having an input that is coupled to an output of the non-differential PSK demodulator and an output that is coupled to an output of the estimator; and
   a subtractor having an output coupled to the error input of the adaptive filter and inputs coupled to the outputs of the estimator and the adaptive filter.

8. The apparatus of claim 7 wherein the adaptive filter is a discrete time filter.

9. The apparatus of claim 7 further comprising a differential decoder having an input coupled to the output of the adaptive filter, to recover the input data that has been differentially encoded in the received communication signal.

10. The apparatus of claim 9 wherein the adaptive filter and the differential decoder together implement an autocorrelator to non-coherently detect the differentially encoded input data.

11. The apparatus of claim 7 further comprising a spread spectrum de-spreader coupled in a signal path before the adaptive filter.

12. The apparatus of claim 10 wherein the adaptive filter further implements a de-spreader.

13. An apparatus comprising:
   means for correcting a received, noise-corrupted communication signal in which a plurality of transmitted symbols represent differentially encoded input data and have been corrupted by one of intra-cell and inter-cell interference;
   means for demodulating the corrected communication signal and modulating the demodulated corrected communication signal each according to non-differential phase shift keying to obtain a plurality of generated symbols; and
   means for adjusting the correction means in response to the corrected communication signal and in response to the plurality of the generated symbols.

14. The apparatus of claim 13 further comprising means for recovering the input data that has been differentially encoded in the received communication signal.

15. The apparatus of claim 14 wherein the input data recovery means and the correcting means comprise means for non-coherently detecting the input data from the corrected communication signal.

* * * * *

UNITED STATES PATENT AND TRADEMARK OFFICE
CERTIFICATE OF CORRECTION

| | |
|---|---|
| PATENT NO. | : 7,103,098 B2 |
| APPLICATION NO. | : 10/099099 |
| DATED | : September 5, 2006 |
| INVENTOR(S) | : Li et al. |

It is certified that error appears in the above-identified patent and that said Letters Patent is hereby corrected as shown below:

In column 9, at line 27, delete the second occurrence of "the".

Signed and Sealed this

Sixth Day of November, 2007

JON W. DUDAS
*Director of the United States Patent and Trademark Office*